Patented Apr. 6, 1926.

1,580,021

UNITED STATES PATENT OFFICE.

WILLIAM CHURCH DAVIS, OF BERKELEY, CALIFORNIA.

MEDICINE.

No Drawing. Application filed September 16, 1925. Serial No. 56,743.

*To all whom it may concern:*

Be it known that I, WILLIAM C. DAVIS, a citizen of the United States, residing at Berkeley, in the county of Alameda and State of California, have invented certain new and useful Improvements in Medicine; and I do hereby declare the following to be a full, clear, and exact description of the invention, such as will enable others skilled in the art to which it appertains to make and use the same.

This invention relates to a medicine and has for its object to provide an efficient and convenient medicinal preparation for the treatment of intestinal stasis or constipation.

Another object of this invention is to provide a medicine, the action of which stimulates peristalsis of the intestines, increasing the function of digestion and facilitating the passage of food through the alimentary tract without the disadvantages usually attendant upon the use of the ingredients of this medicine when taken separately.

The medicine will be more fully described hereinafter and specifically pointed out in the appended claims, it being understood that the formula given is merely by way of example and may be varied by those skilled in the art, particularly in the proportion of the ingredients used, although the precise proportions given have been found to yield excellent results.

Intestinal stasis—commonly known as constipation—is an ill that afflicts a large proportion of civilized mankind, particularly those of advancing years. Remedies therefore are correspondingly numerous, but may be grouped into four general classes: 1, surgical; 2, physical, including special exercises and massage; 3, medicinal, including the administration of purgatives, and 4, natural, including the regulation of diet, use of special foods and lubricants. Combinations of the foregoing methods of treatment are frequently resorted to.

It has long been known to medical science that bran and other foods containing bran roughage can be beneficially used in treating intestinal stasis, because unaffected by the digestive juices of the alimentary canal, the roughage aids peristalsis, and by frictional action on the intestinal walls stimulates the flow of such juices, to the end that better digestion and better progress of foods is had through the alimentary tract of the body.

It is also well known that mineral, paraffin, and other oils which are unaffected by the gastric juices when taken internally lubricate the intestinal walls and facilitate the function of elimination in the body, but the use of bran and other substances containing bran roughage is frequently attended with the danger, because of their immunity to digestion, that such products may pack in the digestive or excretory tract, and by reason of such tendency to pack and consequent increased friction on the intestinal walls result in injury to the intestines. This action has been found to be particularly dangerous in persons suffering from colitis or other abnormalities of the intestines. Likewise persons suffering from piles or other abnormalities of the excretory organ involved frequently also find the use of bran a dangerous remedy or one fraught with serious disadvantages by reason of its tendency to pack with consequent increased irritation of the affected parts.

The separate use of mineral or paraffin oil is likewise frequently attended with such disadvantages as to render its use undesirable by reason of the fact that a given amount of oil may lubricate too freely and result in a seepage or leakage through the rectum before the contents of the bowels is ready for evacuation or after evacuation is completed. Again, the same dose of oil may afford insufficient lubrication.

The present invention therefore relates to a medicine comprising a mixture of mineral, paraffin, or other oil used as an intestinal lubricant, of whatever density, with bran or other substance containing bran roughage until the bran or other substance containing roughage is more or less throughly soaked with the oil, or until the oil has been incorporated with the bran by absorption or adsorption. The bran will then act as an absorbent for the oil, or by reason of its adsorptive and absorptive qualities, the oil will become incorporated with the mass of bran and the both substances conveyed together through the alimentary tract to be simultaneously evacuated without any external seepage or leakage of the oil. On the other hand, the lubricating effect of the oil will be retained and relieve against the packing tendency of the bran roughage and act as a softening agent of the mass, so that its passage through the alimentary tract may be accomplished without damage or irritation to the intestines or parts of the excretory organ involved.

Because of the fact that mineral or paraffin oil, or other oils used as an intestinal lubricant, and the bran or other product made up of bran roughage are both immune to the action of the digestive juices, the passage of the conglomerate mixture of bran and oil through the alimentary tract is practically simultaneous and continuous. The beneficial results of each and the combined and cooperating effect of both therefore remain continuous throughout the journey of this mixture from the mouth to the point of evacuation.

The proportion in which the bran and oil should be employed, and the quantity of the combined mixture which should be taken to overcome intestinal stasis, depend of course on the severity of the constipation and the extent to which irritation of the intestines would be dangerous. Each ingredient may be varied, preferably by progressively adding as much oil, up to the limit of the adsorptive capacity of the bran, the respective amounts being held within the limits stated in order to produce a substantially homogeneous mass, in which the oil is so thoroughly incorporated into the bran that the oil is held as a thin film coating the individual particles of the bran, and in such absorptive relation that no free oil is apparent.

As so prepared, the mass is of about the consistency of butter at about 50°–70° F., and when taken is entirely free of the possibility of causing the objectionable leakage which so often accompanies the administration of free oil. In practice, in the treatment of constipation of average severity, I find the proportion of about 6 or 8 fluid ounces of oil to one pound avoirdupois of bran to give very satisfactory results.

This medicinal mixture of predetermined proportions may be used in the form of muffins, bread, or other cooked or baked foods, the oil partially or completely supplanting the shortening material ordinarily used. Such a cooked or baked article will also be found beneficial to those persons whose corpulence requires a reduction in those fat-producing agents such as lard, butter, or other shortenings ordinarily used.

In describing this invention I have referred to one embodiment thereof and have specifically described the proportions which have been found to give good or best results in practice, but I do not wish to be restricted to the embodiment nor proportions stated except in so far as I may be restricted by the following claims.

I claim:—

1. A medicine for the treatment of intestinal stasis, comprising bran roughage and a neutral bland oil combined into a substantially homogeneous mass in such proportions that the oil is held absorbed in the bran mass, without the presence of free oil.

2. A medicine for the treatment of intestinal stasis comprising bran roughage and a bland neutral oil, in such proportions that the bran is in excess by weight over the oil, the whole being admixed into a substantially homogeneous mass, wherein the oil will relieve against any packing tendency of the roughage, and is so held as to prevent external leakage or seepage.

3. A medicine for the treatment of intestinal stasis comprising bran roughage and a bland neutral oil in proportions of substantially two parts by weight of bran to one part by weight of oil, the whole being admixed into a substantially homogeneous mass.

WILLIAM CHURCH DAVIS.